April 22, 1958 S. H. YOUNG ET AL 2,831,957
METHOD AND APPARATUS FOR FORMING FINNED STRUCTURES
Filed Aug. 19, 1954 4 Sheets-Sheet 2

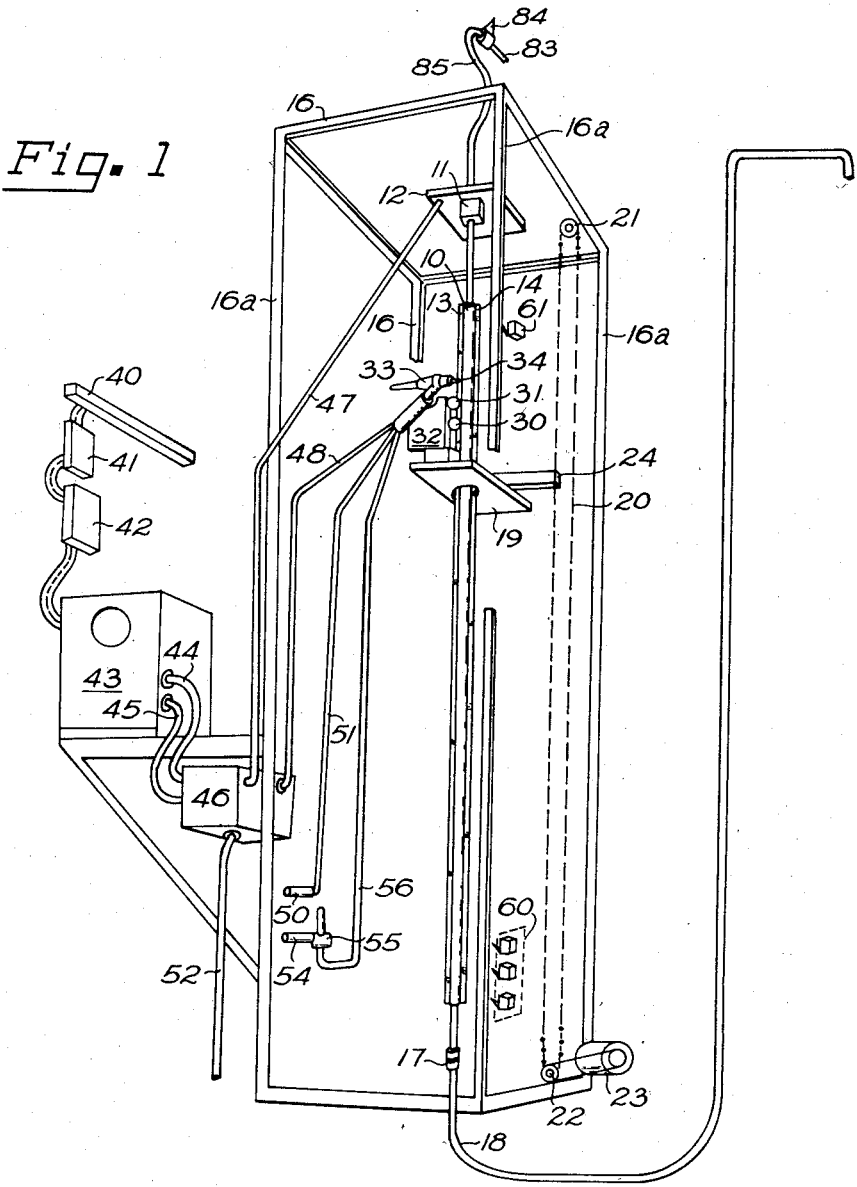

KENNETH J. CARTER
SAM H. YOUNG
INVENTORS

BY D. Carl Richards
ATTORNEY

April 22, 1958   S. H. YOUNG ET AL   2,831,957
METHOD AND APPARATUS FOR FORMING FINNED STRUCTURES
Filed Aug. 19, 1954   4 Sheets-Sheet 3
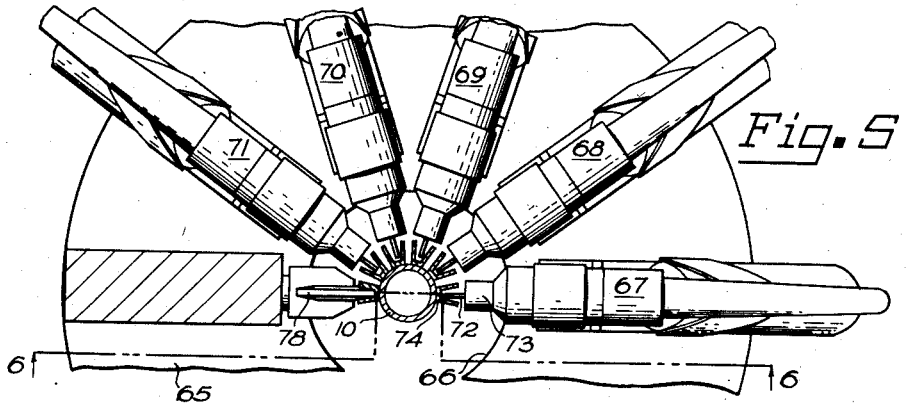
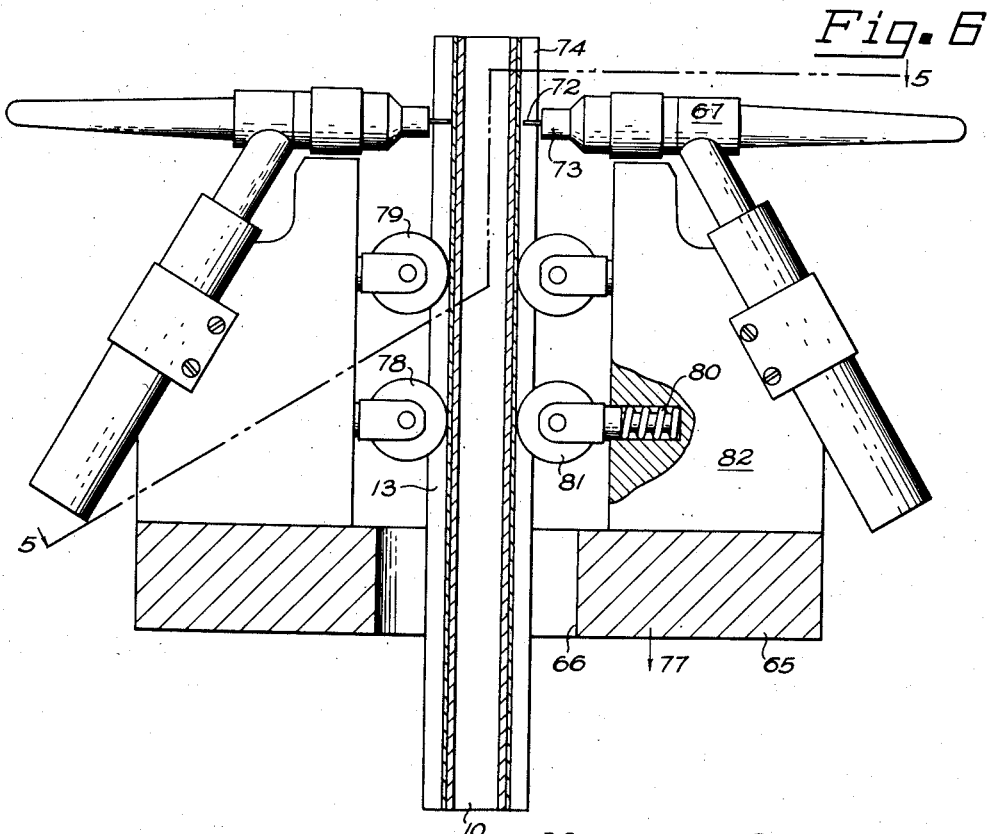
KENNETH J. CARTER
SAM H. YOUNG
INVENTORS
BY *D. Carl Richards*
ATTORNEY

KENNETH J. CARTER
SAM H. YOUNG
INVENTORS

BY D. Carl Richards
ATTORNEY

United States Patent Office 2,831,957
Patented Apr. 22, 1958

2,831,957

METHOD AND APPARATUS FOR FORMING FINNED STRUCTURES

Sam H. Young and Kenneth J. Carter, Dallas, Tex., assignors, by mesne assignments, to American Locomotive Company, a corporation of New York, now by change of name to Alco Products, Incorporated Application August 19, 1954, Serial No. 450,994

17 Claims. (Cl. 219—124)

This invention relates to the fabrication of finned structures and more particularly to overcoming problems in producing structures of high strength and corrosion resistant materials such as stainless steel, non-ferrous materials, and the like. A more specific aspect of the invention relates to the provision of a system for continuously welding a plurality of elongated steel channels longitudinally along the periphery of a tube.

Substantial surface areas on heat exchange elements along with ability to operate at extremely high temperatures in the presence of corrosive fluids and gases are highly desirable characteristics. Heretofore fabrication of finned tubes of such materials as stainless steel has been extremely difficult and in many instances has required resort to hand welding techniques in order to produce structures within acceptable tolerances. The problem presented may be appreciated when it is understood that in many applications a flow channel of the order of an inch in diameter with as many as twenty (20) or more longitudinal fins is desired.

It is an object of the present invention to provide a system for fabricating a finned tube which includes at least a pair of guide structures located at diametrically opposed points relative to the axis of the tube together with means for producing relative motion between the guide structure and the tube. Resiliently mounted rollers positioned at diametrically opposed points engage web sections of fin channels and maintain the web section in contact with the tube. Means are provided immediately adjacent each of the rollers for establishing a welding arc between adjacent pairs of fins in an atmosphere of an inert gas thermally to produce a continuously welded substantially homogeneous bond between the web of the fin channel and the wall of the tube.

It is a further object of the invention to provide a finned tube through the process of establishing an electrical arc in an atmosphere of an inert gas adjacent the surface of a relatively thin portion of a fin member opposite the point of contact between said thin portion and the wall of the tube.

In accordance with the present invention there is provided a method for producing welds in heat exchange structures of high strength corrosive resistant material within close tolerances and without producing harmful effects on the materials used. Further, accurate alignment and substantial parallelism between all fins affixed around a given tube is maintained. In a further aspect of the invention means are provided for producing a continuously welded substantially homogeneous structure having a wide weld base thereby to provide high heat conductivity across the weld area and to the fins proper and to eliminate retention pockets along the edges of the weld site for fluids, the retention of which may accelerate corrosion activity.

In another aspect of the invention there is provided a system for simultaneously securing a plurality of channels to the periphery of a tube through use of penetration welds at continuously changing sites oriented such that puddling at all weld sites is subjected to identical gravitational fields thereby to assure uniformity of product.

For other objects and advantages of the present invention and for a more complete description thereof, reference may now be had to the following description taken in conjunction with the accompanying drawings in which:

Fig. 1 is an isometric representation of a system for producing a finned tube;

Fig. 5 is a view of a portion of a multi-head welding unit taken along the line 5—5 of Fig. 6;

Fig. 6 is a sectional view of the welding head taken along the line 6—6 of Fig. 5;

Figure 2:
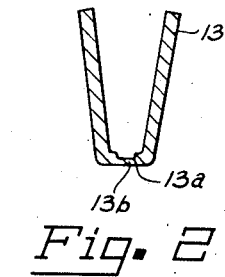
Fig. 2 is a cross-sectional view of a fin channel.

Referring first to Fig. 1 there is illustrated a system which includes, for the purpose of simplicity, only a single welding unit which shall be taken as representative of a plurality of such units utilized in accordance with the present invention to produce a heat exchange unit generally known in the art as a "finned tube." An elongated tube 10 is fastened in a clamping unit 11 forming a part of or supported by an upper platform 12. A plurality of channels, two of which, the channels 13 and 14, are shown in Fig. 1, are to be welded to the surface of tube 10. Referring to Fig. 2 the channel 13 is a U-shaped structure having a relatively narrow base or weld section 13a which, in accordance with the preferred embodiment of the invention, is thinned at the midsection 13b as through a cold-rolling process.

Figure 3:
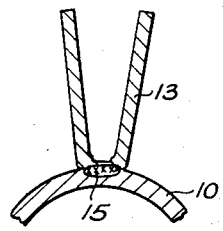
Fig. 3 is a cross-sectional view of the fin channel of Fig. 2 welded to the periphery of a tube.

Referring now to Fig. 3, the fin 13 is shown affixed to the periphery of the tube 10, a portion of which has been shown in section. The welding operation is performed such that a relatively broad, substantially homogeneous weld area 15 is produced at the boundary between fin 13 and tube 10.

In accordance with the present invention a plurality of channels such as channel 13 are simultaneously welded to the periphery of a tube to form a multi-fin tube. In one form of the present invention ten channels simultaneously were welded to the surface of a one-inch diameter tube to form twenty fins thereon. The operation was carried out utilizing a system generically illustrated in Fig. 1.

More particularly in Fig. 1, a frame 16 supports the platform 12 at or near the top thereof. Clamping mechanism 11 supports and positions tube 10 with its axis vertical along a line conveniently located at the axis of the structure 16. The lower end of tube 10 is connected through coupling 17 to a flexible tube 18. An elevator or a movable platform 19 is supported by a chain drive system including the chain 20 supported at the top of frame 16 by a pulley 21 and at the bottom by a drive wheel 22. Wheel 22 is drive connected to a motor 23.

Chain 20 is coupled to platform 19 to move it along the length of tube 10. In Fig. 1 this coupling is represented by the arm 24. It is to be understood that platform 19 preferably is positioned centrally of frame 16 as by means of rollers (not shown) engaging the corner posts 16a or other guide means which may be provided as well understood by those skilled in the art.

Platform 19 supports a system of rollers and a welding head, including rollers 30 and 31 and head 33. A torch holder 32, later to be described in detail, is mounted on platform 19 and supports the rollers 30 and 31. Additionally holder 32 supports the welding torch 33. The torch 33 preferably is characterized by operation through the production of an electrical arc which is maintained in an atmosphere of an inert gas such as helium or argon. Representative torches suitable for use in this system are manufactured and sold by Linde Aire Products Co. of New York, New York, under the trade name of "Heliarc."

Elements necessary to establish and maintain such a welding atmosphere, in accordance with the present invention, are mounted in part on platform 19 for movement from a first position wherein the welding electrode 34 is at upper end of channel 13 and where an arc is initiated to the lower end of channel 13 where the arc is extinguished.

A first requirement is a suitable welding current. This current may be provided as from a source bus 40 connected through a main switch 41 and a control relay 42 to a welding generator 43. Two output conductors 44 and 45 lead from generator 43 to a high frequency unit 46. A ground conductor 47 leading from unit 46 is connected to the platform 12 which form the ground terminal of the welding system. A cable 48 connected to unit 46 leads to the torch 33. When welding generator 43 is energized a welding current is available for maintaining a welding arc. Momentary energization of the high frequency unit 46 serves to strike an arc between welding electrode 34 and channel 13. Cooling water is channeled from a water main 50 through tube 51 to the torch 33. Commercially available torches are provided with flow channels therethrough for coolants. Cooling water is then conducted through cable 48 and through unit 46 to a suitable waste or recycle system including tube 52.

An atmosphere of an inert gas must be maintained around arc and welding electrode to eliminate oxidation of the electrode and work. In Fig. 1 inert gas is supplied to the torch 33 from a gas manifold 54 which is connected through a regulating valve 55 and a channel 56 to the torch 33. As will be shown later electrode 34 is positioned in a cup-shaped element into which the inert gas from channel 56 flows to maintain the arc in a non-oxidizing atmosphere.

A bank of limit switches 60 at the lower end of the frame 16 serve automatically and sequentially to: (1) cut off the arc; (2) stop the flow of cooling water and flow of inert gas, and (3) stop motion of platform 19. An upper limit switch 61 serves to stop upward movement of platform 19 at a predetermined location.

Details of a specific embodiment of the invention, particularly the torch 33 and the associated supports, are shown in Figs. 5 and 6. For convenience and where appropriate the same reference characters will be used as in Fig. 1. Referring to Figs. 5 and 6, a base plate 65, having central opening 66, encircles the tube 10 and its associated fins. As shown in Fig. 5 five torches 67, 68, 69, 70 and 71 are shown in their normal position with welding electrodes such as electrode 72 extending through a cup member 73 into and adjacent the web of the channel members such as channel 74. Each of the torches 67–71 extend outward radially from the center of tube 10. Five similar torches (not shown) were provided to span the remaining portion of the circumference of tube 10.

The torches move downward in the direction of arrow 77 relative to tube 10 during a welding operation. In order to maintain the channels in intimate contact with tube 10 at the welding site, a plurality of rollers, two of which, the rollers 78 and 79, contact the associated channels ahead of the torch and are resiliently biased into pressure contact with the web. Additionally, if desired, drag strips may be provided which serve further to force the channel against the tube. As shown in Fig. 6 a spring 80 urges roller 81 toward channel 13 and away from the torch support 82. The torch support 82 is rigidly secured to the base member 65 which is secured to or otherwise forms a part of platform 19 of Fig. 1.

Preferably, though not necessarily, channels will be welded in pairs positioned at diametrically opposed locations around the periphery of an associated tube so that opposing stresses will be exerted on the tube by pressure applying means such as rollers 78, 79, 81 or suitable springs or the like.

It is to be understood that the welding system will include a plurality of welding torches such as shown in Fig. 5 together with a like number of welding generators such as generator 43 and a like number of high frequency generators such as generator 46. Such units together with a common cooling water supply and inert gas manifold culminate in delivering electrical energy, inert gas, and cooling water to the welding torches. Simultaneously there is provided relative movement between the welding torches and the tubular members. Means are provided to prevent establishing an arc when inert gas is not present or when cooling water is not present thereby to prevent oxidation of portions of the torch or of the work pieces.

Referring again to Fig. 1 and in accordance with a preferred embodiment of the invention there is provided at the upper end of the platform 16 a source of cooling water as from a pipe 83 and connected to a valve 84. A tube 85 leads into the coupling device 11 to deliver cooling water through tube 10. Valve 84, as will hereinafter be explained, is open to permit flow of cooling water during the pass of welding arc along the tube 10. The cooling water flowing through the lower end of tube 10 into tube 18 is forced upwardly to a height at least equal to the highest point along tube, an arc may exist in order to maintain a bubble free column of cooling water throughout the portion of the tube 10 corresponding with the welding traverse.

Figure 7:
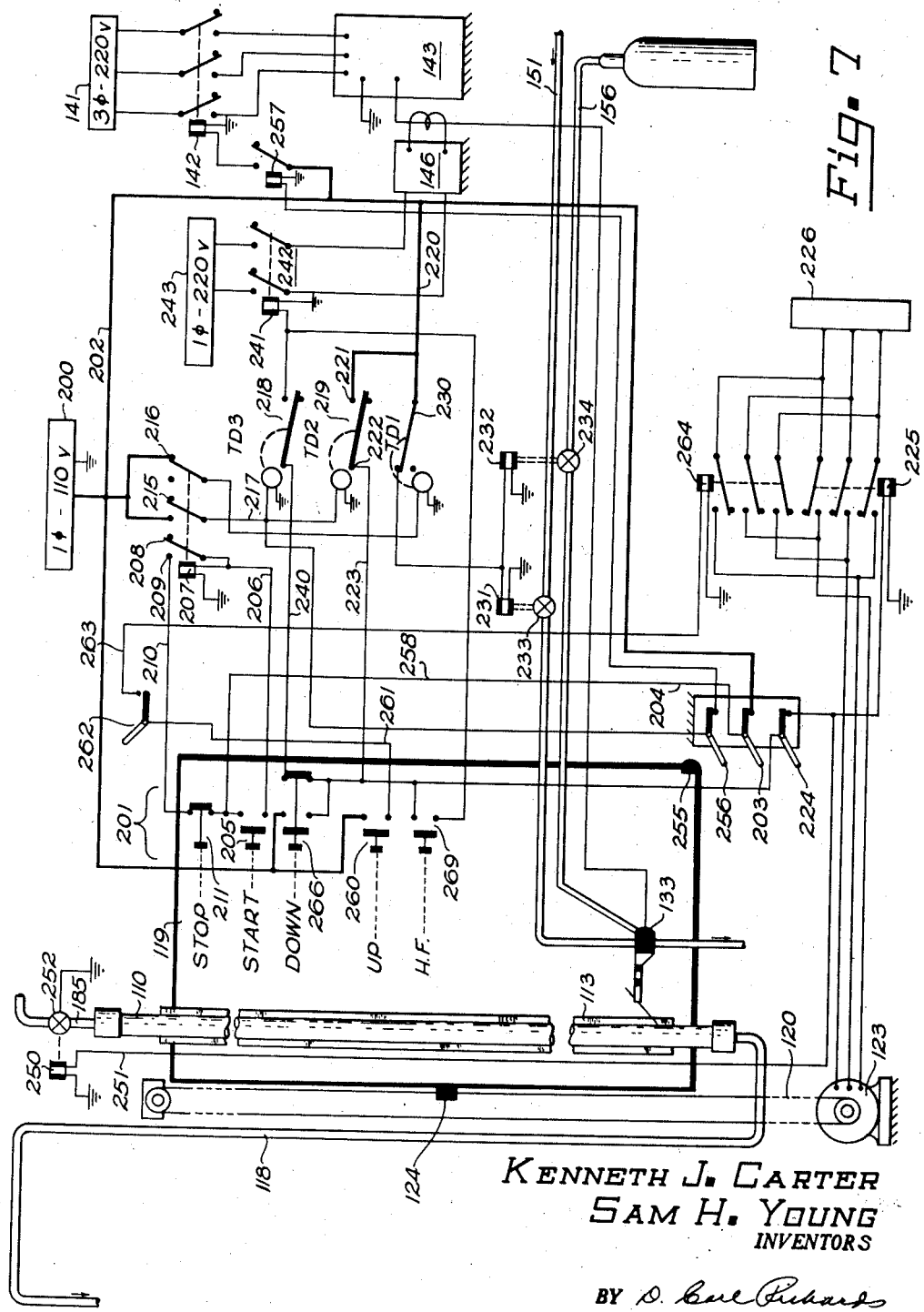
Fig. 7 is a schematic wiring diagram of the system shown in Fig. 1.

Referring now to Fig. 7 there is illustrated in detail the electrical system for carrying out operation diagrammatically represented in Fig. 1. Elements common to Fig. 1 and Fig. 7 bear the same reference character as in Fig. 1 except in Fig. 7 are prefixed by the digit (1). For example, platform 19 of Fig. 1 is represented in Fig. 7 by the rectangle 119.

In the system of Fig. 7 the following functions are performed in the course of fabricating one "finned" tube. (1) The welder 143 is energized simultaneously with initiation of flow of water through tube 151 and initiation of flow of inert gas through tube 156 to the torch 133. Also cooling water begins to flow through tube 185 leading to the top of tube 110. (2) Immediately thereafter the high frequency unit 146 is energized to strike an arc and promptly the unit 146 is deenergized after establishing an arc and simultaneously motion is initiated. Welding takes place as torch 133 carried by platform 119 moves downward along the length of the tube 110. (3) When torch 133 reaches the lower end of the fins, a first switch is opened deenergizing welder 143, a second switch is opened which stops the flow of cooling water and inert gas, and a third switch is opened which stops travel of platform 119.

To accomplish the foregoing, torch 133 is supported on platform 119 with the welding electrode adjacent the base of fin 113. Motor 123 drives the chain or belt 120 which is linked at clamp 124 to the platform 119. Power for control of a relay system is transmitted from a suitable source 200 through a "start" switch of the push-button type mounted in a switch bank 201 carried by platform 119. More particularly one terminal of source 200 is connected to ground and the other terminal is connected by way of conductor 202 to one terminal of a normally closed lower limit switch 203. The second terminal of switch 203 is connected by way of conductor 204 to one terminal of a push-button "start" switch 205. The second terminal of switch 205 is connected by way of conductor 206 through the coil 207 and then to ground. Conductor 206 is also connected to arm 208 of a normally open relay circuit. The associated terminal 209 is connected by way of conductor 210 through normally closed push-button "stop" switch 211 to conductor 204. Thus when switch 205 is momentarily closed relay 207 is energized. In the closed position a current flows through arm 208 and conductor 210 to maintain coil 207 energized after start switch 205 is released. Thus switch 205 serves manually to start a welding operation by initially energizing coil 207. A welding operation may be stopped at any time by an operator by opening stop switch 211 which deenergizes coil 207. It is to be noted that the second terminal of source 200 also is connected to normally open circuit 215 and normally closed 216 which are both controlled along with arm 208 by coil 207. Current flow through circuit 216 is interrupted upon energizaton of coil 207.

Prior to the start of a welding run, relay coils 218 and 219 are not energized. Relay power is available at normally open terminal 221 of time delay relay 219. Terminal 222 of relay 219 is connected by way of conductor 223 through the lower limit switch 224 to a relay coil 225 which controls motor 123 with power from a source 226. When coil 207 is energized, current flow through terminal 216 is terminated actuating armature 230 and permitting current to flow from conductor 220 through coils 231 and 232 which respectively opens valve 233 in the cooling water line 151 and valve 234 in the inert gas line 156. After a first predetermined time interval relay 219 is closed permitting current flow from terminal 221 through switch 224 and coil 225 to apply power to motor 123 to start downward motion of platform 119. Similarly, a second time delay relay 218 is closed and after the same predetermined time interval, current flows through conductor 240 and relay coil 241 to close switch 242 to apply power from a voltage source 243 to the high frequency arc striking unit 146.

It will now be seen that the relay 230 first closes a circuit to initiate flow of cooling water through tube 151 and inert gas through tube 156. Immediately thereafter relay 218 causes energization of the high frequency unit to strike a welding arc. Simultaneously relay 219 causes energization of the motor relay 225 and energizes valve coil 250 at the upper end of pipe 110 by current flow through conductor 251 to open the valve 252 to permit flow of cooling water downward through pipe 110 and then upward through channel 118 to a suitable waste.

When platform 119 travels to the point that torch 133 is at the bottom of fin 113 the cam surface 255 carried by platform 119 first opens switch 256 which deenergizes relay 257 to cut off power from welder 143. Immediately thereafter cam 255 opens switch 203, opening the circuit including conductor 258 over which holding current for master relay 207 flows. This action deenergizes relays 218, 219, and stops motion of platform 119. Simultaneously, a circuit through contact 216 is closed, whereupon after a predetermined time delay relay 230 is activated to stop flow of cooling water through valve 233 and inert gas through valve 234.

Tube 110 with the fins securely welded thereto may then be removed from the system. Thereafter closure of "up" switch 260 will cause current to flow through conductor 261, upper limit switch 262, conductor 263 and relay 264. This closes a circuit from source 226 to motor 123 of such phase as to reverse the direction of motor 123 to raise platform 119 preparatory to a second welding run. When "up" switch 260 is released or when cam 255 opens upper limit switch 262, upward motion of platform 119 is arrested.

An independent "down" control switch 266 is provided for adjusting the position of platform 119 downward by closing relay 225 without energizing other elements of the system. Manual operation of switches 260 and 266 permits positioning of the platform 119 at any desired level independent of welding operation.

A fifth control switch 269 (H. F.) is provided for energizing high frequency unit 146 for emergency purposes. This circuit may be utilized if, for some reason during a welding operation, one of the arcs should become extinguished. In practice it has been found preferable to mount the control switch bank 201 on platform 119 conveniently available to an operator who may then observe and control the welding operation.

Figure 4:
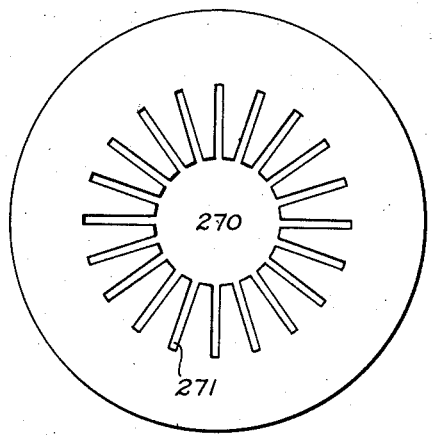
Fig. 4 illustrates a positioning template used in the welding operation shown in Fig. 1.

Preparatory to the start of a welding run, platform 119 is positioned near its highest level and a tube such as tube 110 in a fin channel assembly is passed through a welding head shown in Figs. 5 and 6. The assembly is held together by a series of templates such as shown in Fig. 4 located at spaced points along the assembly. The templates of Fig. 4 may be formed of sheet metal with a central opening 270 complementary with the exterior webs of channels surrounding tube 110. Radially extending slots such as slot 271 are provided to fit over the channels and securely to maintain them properly spaced one from another around the circumference of the tube 110. The upper end of tube 110 is then placed in a clamping mechanism preferably of the collet type. The clamping mechanism, at ground potential, holds the tube in place, grounds it, and connects it to the tube 185 from cooling water valve 252. The operator then momentarily closes switch 205 which in sequence energizes welder 143, initiates flow of water through valves 233 and 252, and additionally initiates flow of inert gas through valve 234. Immediately thereafter motion begins and high frequency unit 146 is energized through operation of relay 219 and time delay means incorporated therein. Immediately thereafter high frequency unit 146 is cut off.

Welding of fins to the tube then takes place as the welding head moves downward along the length of the tube. The rollers in the head press the channels against the tube at a point as close to the arc or torch as possible. Weld heat is transferred to the tube and fin interface producing a bond. Vertical orientation of the tube and channels makes certain that a uniformly welded fin structure will be produced. The intense heat of the arc causes puddling of the metal and all such puddles so produced are in identical gravitational fields. By continuously moving the arc relative to the work, where the arc produces a penetration type weld, a finned tube possessing qualities of uniformity, strength, and corrosion resistance is produced not approached by other methods. Continuously welding channels provides weld sites substantially free of retention pockets wherein fluids may cause accelerated corrosion activity such as plague prior art structures.

At the end of a welding operation switches 256 and 203 sequentially are opened. Welder 143 is cut off by switch 256. Relay 207 is deenergized by switch 203. Thereupon relay 230 is energized. However, relay 230 preferably is provided with time delay means such that the electrical circuit to relays 231 and 232 is not closed through relay 230 for a predetermined period after welding ceases so that flow of gas through valve 234 continues for a time sufficient that the welding electrode may fall below an oxidation temperature. At that time the circuit through relay 230 closes and flow of cooling water and inert gas is terminated.

Figure 8:
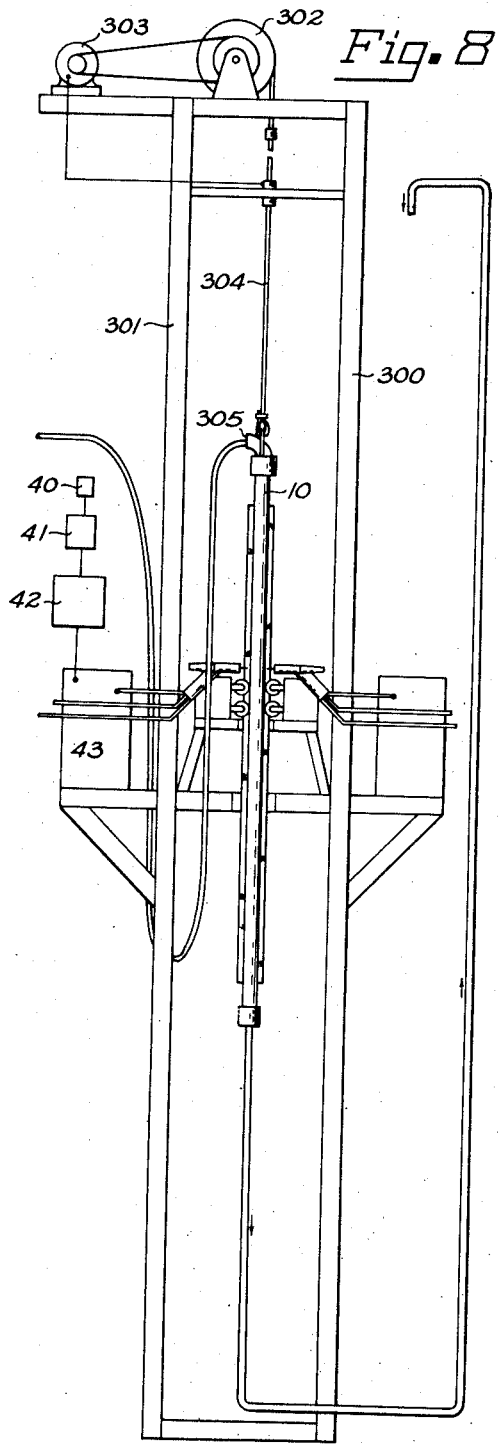
Fig. 8 is a modification of the system of Fig. 1.

The system above described contemplates fixedly clamping the fin tube structure and moving a welding head along it. In Fig. 8 there is illustrated a system in which the welding head structure is maintained fixed in position with the fin tube structure movable relative thereto during the welding operation. More particularly an elongated tower comprising upright supports 300 and 301 support a cable drum 302 which is driven by a motor 303. A cable 304 is connected to the upper end of tube 10. A cooling water hose 305 is connected to the upper end of tube 10 through means commonly employed in systems such as rotary drills and the like. The supply bus 40, breaker system 41, and relay unit 42 are connected to welder 43 as in Fig. 1. In this system, however, motion of the fin structure controls limit switches such as switches 262, 256, 203 and 224 of Fig. 7. Otherwise the welding operation is the same as above described in connection with Figs. 1 and 7.

In a preferred form welding takes place upon relative movement between tube and welding head such that the tube moves upward or the welding head moves downward. However, the reverse order may be employed so long as pressure rollers or drag strips precede the welding head to maintain contact between the work pieces.

From the foregoing description it will be recognized that fusion welding of the channels to a tube produces a weld which is characterized by a zone of fusion uniform in width and depth along the entire length of the channels. Further the fusion zone has a width substantially equal to the inside width of the web. The penetration or fusion type weld of channels to the tube in a vertical position assures uniformity of fusion at all points around the tube. The puddles of metal at all weld points is uniformly oriented in the earth's gravitational field thereby producing a fused zone with puddle patterns singularly repeated over the entire length of each fused zone and additionally, identical at any point of fusion around the circumference of the tube.

The operation of the relay system provides for automatic control of flow of inert gas to prevent oxidation and further controls automatically the flow of coolant to remove heat from the fusion zone. The relay system further assures continued flow of inert gas and of coolant after the arc is extinguished for a predetermined time interval sufficient to allow the temperature of the welding electrode and the work immediately adjacent thereto to cool to a temperature below the region of fusion temperatures.

As above described a preferred form of the invention employs water as a coolant but it will be readily appreciated that moisture laden air may be pumped through tube 10 for cooling purposes rather than water.

Applicant's invention further involves the production of a new and useful heat exchange unit in which a tube is joined to a plurality of channel shaped fin members which extend longitudinally therefrom with the webs of the channels engaging the outer surface of the tube wherein each channel member is united to the tube by a zone of fusion of the metal of the tube and the channel members which is uniform in depth and width along the entire length of the channel members. A smooth edge weld is thus produced which distinguishes from prior systems. Uniform longitudinal welds eliminate cavities or pockets between the base of the channel members and the tube which otherwise would form sites, through retention of liquids, of accelerated corrosive action.

For most efficient operation as a heat exchange unit the fin tube should be characterised by both circumferential and longitudinal uniformity insofar as the welds are concerned for heat flow from the tube sections to the fin sections.

While the invention has been described in connection with securing channels to a tube, it will be understood that different geometrical patterns may be utilized other than U-shaped channels. For example elongated L-shaped fin structures may be affixed to the periphery of a tube. However, in one embodiment of the invention the fin tube structure comprised a one-inch diameter stainless steel tube having walls of .083 inch thickness with U-shaped fin channels formed of .034 inch thick flat stock having a web of approximately one-fourth inch, and fins of approximately three-fourths inch. The webs were thinned as illustrated in Fig. 2 to .015–.025 inch to enhance heat penetration through the web to the adjacent tube. Ten such channels were fused to a single tube forming twenty peripheral fins substantially identical in character at all welded zones.

While the invention has been described in connection with certain embodiments thereof, it will be understood that further modifications may now suggest themselves to those skilled in the art and it is intended to cover such modifications as fall in the scope of the appended claims.

What is claimed is:

1. The method of forming a heat exchange unit from a tube and fins having longitudinal base portions which comprises contacting under pressure in at least one zone the surface of said tube with a plurality of said base portions extending along the length thereof, establishing a welding arc in an atmosphere of an inert gas to said base portion opposite the contact zone, simultaneously moving said contact zone and said arc along the length of said base portion and said tube to fuse the metals of said base portion and tube in the contact zone in a weld of substantially uniform lateral dimension relative to said tube.

2. The method set forth in claim 1 in which a substantially uniform coolant flow is maintained in the tube adjacent the contact zone to remove heat therefrom following fusion.

3. The method of claim 1 in which said relative movement is at least as extensive in time duration as said arc and in which said atmosphere of inert gas is maintained for a greater time duration.

4. A system for forming a heat exchange unit from a tube and a plurality of channels which comprises means for assembling said channels in contact with said tube, means for establishing relative movement between said tube and channels and a welding point, and means for establishing a shielded arc inside each of said channels only during said relative movement.

5. A system for forming a heat exchange unit from a tube and a plurality of channel shaped fin members which comprises means for assembling said members with the bases thereof adjacent the exterior of said tube, means for producing uniform relative movement between both said tube and channel members and a welding point, means for establishing a shielded arc inside and adjacent the base of each channel member to fuse the contact areas of said channel members and said tube, and means for removing heat from the zone inside said pipe opposite said welding point.

6. The combination set forth in claim 5 in which establishment of said arc and actuation of said heat removing means are controlled in predetermined timed relation to initiation of said relative movement.

7. The combination set forth in claim 6 in which said heat removing means is actuated at least as soon as the initiation of said arc.

8. The combination set forth in claim 6 in which said heat removing means is actuated for a period after extinction of said arc.

9. The combination set forth in claim 5 in which flow of inert gas is utilized to shield said arc with means for maintaining said flow after extinction of said arc for a predetermined cooling period.

10. A system for securing channels to a tube to form a heat exchange unit which comprises means for supporting said tube at one end with the axis thereof vertical, means for positioning said channels around said tube extending parallel to said axis to form a work-array, welding means extending into each of said channels to points adjacent but spaced from the webs of said channels, means for producing uniform relative movement between said welding means and said array over the length of said channels, means for establishing welding arcs in an atmosphere of inert gas between each of said electrodes and an adjacent web concurrently with said relative movement only for substantially uniform penetration of heat through said webs to the contacts thereof with said tube to fuse said webs to said tube uniformly over the entire length of said channels.

11. A system for forming a heat exchange unit from a tube and longitudinal means forming channels having base portions comprising means for supporting said tube with a plurality of channels having the base portions thereof adjacent said tube, means for producing uniform pressure contact between each base portion and said tube and synchronized means for establishing a shielded arc inside said channels adjacent each said base portion and relative movement between said arc and tube at least coextensive in duration with existence of said arc.

12. A system for forming from a tube and channel members a heat exchange unit which comprises a pair of guide structures located at diametrically opposed points relative to a tube, drive means for producing relative motion between said guide structures and said tube, resiliently mounted rollers positioned at diametrically opposed points for engaging the webs of a pair of said channel members to contact said tube, means adjacent to each of said rollers for establishing a welding arc to the webs of each of said channels, means for maintaining in the region of the arcs inside said channels an atmosphere of an inert gas, and control means for preventing establishing said arc except during said relative movement.

13. In a system for forming a heat exchange unit from an elongated tube and a plurality of U-shaped channels, the combination which comprises means including a liquid flow channel for clamping one end of said tube with its axis substantially vertical, means for positioning said channels around the periphery of said tube, a welding electrode extending to a point inside each said channel and adjacent the web thereof, an elevator including a support for each said welding electrode and adapted to move each said electrode from one end of said channel to the other, at least a pair of flow channels to each said electrode for delivering an inert gas to the region of said electrode inside said channel and a coolant fluid to each said support, a source of welding current connected to said electrode, and control means for substantially simultaneously initiating movement of said electrode, flow of said inert gas and flow of cooling liquid to said supporting means and through said tube and after a predetermined time interval to strike an arc between said electrode and the base of said channels.

14. Combination set forth in claim 13 in which said control means includes means for automatically extinguishing said arc at the end of said channel opposite to the point of beginning and which stops movement thereof and flow of said inert gas and cooling means a predetermined time interval after extinction of said arc.

15. The combination set forth in claim 13 in which a plurality of channels simultaneously are fused to a single tube through the provision of a plurality of welding electrodes positioned in a common plane normal to the axis of said tube and in which there is provided a common source of said inert gas and said cooling means actuated under the control of said control means.

16. A system for fabricating a heat exchange unit from a tube and a plurality of fins each having base portions and positioned along and to be fused to said tube which comprises means for supporting said tube with its axis substantially vertical and with a plurality of said fins contacting the periphery of said tube at the base portions thereof, a welding electrode adjacent the base portion of each fin on the side thereof opposite the contact to said tube, an elevator including support means for each said electrode and adapted to move the electrode from one end of said fins to the other and a source of welding current for each said electrode, means for directing flow of inert gas in the region of each said electrode to establish a non-oxidizing atmosphere therefor, flow channels for directing flow of coolant through said tube and through the support means for each said electrode, a control system including relay means for automatically and substantially simultaneously initiating flow of said coolant and of said inert gas and for initiating movement of each said electrode from one end of said fins toward the other end thereof, means operable after a predetermined time interval for striking an arc between each said electrode and adjacent base portions for elevating the temperature of said tube and said base portions adjacent each said electrodes to a fusion temperature, and means for maintaining pressure contact between said tube and said base portions during the time interval that the temperature is in the range of fusion temperature.

17. The combination set forth in claim 16 in which there is provided means operable when each said electrode is adjacent said other end for first extinguishing said arc then to stop movement of said elevator and flow of said coolant and said inert gas.

References Cited in the file of this patent

UNITED STATES PATENTS

| | | |
|---|---|---|
| 1,536,774 | Clarkson | May 5, 1925 |
| 1,612,317 | Reed | Dec. 28, 1926 |
| 1,797,795 | Ruhr | Mar. 24, 1931 |
| 2,031,138 | Taylor | Feb. 18, 1936 |
| 2,132,975 | Shaver | Oct. 11, 1938 |
| 2,151,378 | Elsey et al. | Mar. 21, 1939 |
| 2,167,901 | Murray | Aug. 1, 1939 |
| 2,298,250 | Brown | Oct. 6, 1942 |
| 2,304,788 | Bailey | Dec. 15, 1942 |
| 2,473,633 | Brown | June 21, 1949 |
| 2,483,454 | Brown | Oct. 4, 1949 |
| 2,510,207 | Behnke et al. | June 6, 1950 |